United States Patent
Delaere et al.

(10) Patent No.: US 6,991,099 B2
(45) Date of Patent: *Jan. 31, 2006

(54) CONFIGURATION OF CLARIFIED POLYPROPYLENE OPTICAL DISC STORAGE UNITS

(75) Inventors: Marc Delaere, Lochristi (BE); Rajnish Batlaw, Spartanburg, SC (US); Roberto Guzman, Villa Verdun (MX); Pedro Van Hoecke, Singapore (SG)

(73) Assignee: Milliken & Company, Spartanburg, SC (US)

( * ) Notice: Subject to any disclaimer, the term of this patent is extended or adjusted under 35 U.S.C. 154(b) by 184 days.

This patent is subject to a terminal disclaimer.

(21) Appl. No.: 10/122,718

(22) Filed: Apr. 15, 2002

(65) Prior Publication Data

US 2003/0192794 A1    Oct. 16, 2003

(51) Int. Cl.
   *B65D 85/57*     (2006.01)
(52) U.S. Cl. .................. 206/308.1; 206/232
(58) Field of Classification Search ........... 206/308.1, 206/309–313, 493, 232, 387.1, 459.5, 499; 402/73; 281/15.1
   See application file for complete search history.

(56) References Cited

U.S. PATENT DOCUMENTS

| | | | |
|---|---|---|---|
| 4,566,590 A * | 1/1986 | Manning et al. ............ 206/232 |
| 4,829,691 A * | 5/1989 | Manjos et al. ................ 40/661 |
| 4,998,985 A * | 3/1991 | Sankey .................... 206/387.1 |
| 5,263,579 A * | 11/1993 | Blackman ................... 206/232 |
| 5,360,628 A | 11/1994 | Butland ........................ 427/7 |
| 5,415,288 A * | 5/1995 | Ozaki ...................... 206/387.1 |
| 5,452,282 A | 9/1995 | Abraham .................... 369/603 |
| 5,515,967 A * | 5/1996 | Fitzsimmons et al. ... 206/307.1 |
| 5,575,387 A | 11/1996 | Gelardi .................... 206/308.1 |
| 5,731,474 A | 3/1998 | Scrivens et al. |
| 5,782,347 A | 7/1998 | Fantone et al. .......... 206/308.1 |
| 5,785,172 A | 7/1998 | Bolognia et al. ........ 206/308.1 |

(Continued)

FOREIGN PATENT DOCUMENTS

EP         0 608 358           9/1996

OTHER PUBLICATIONS

International Search Report or the Declaration; International Application No. PCT/US03/10947; International Filing Date: Apr. 9, 2003.

*Primary Examiner*—Shian T. Luong
(74) *Attorney, Agent, or Firm*—Terry T. Moyer; John E. Vick, Jr.

(57) ABSTRACT

Novel, quick, and reliable detection methods for determining the authenticity of optical and/or audio disc articles (such as compact discs, digital video discs, CD-ROM discs, and the like) are provided. Such a method basically entails the incorporation of an identifier or marking means within the edges of target optical discs or within any other portion of a target disc such that exposure to non-visible light sources will provide the desired identification upon irradiation or detection of the marking means therein. Such an identifier or marking agent thus may be utilized in conjunction with a transparent holding case whereby the needed light source may be exposed through the transparent walls thereof to permit detection of counterfeit or authentic discs without requiring opening of the case itself. Such a method may also be utilized for discs that are removed from or have not been placed and sealed within such a case as well. Specific methods of utilizing particular transparent cases are thus also encompassed within this invention. Specific methods of utilizing particular transparent cases are thus also encompassed within this invention as are novel storage unit configurations to maximize the benefits of the transparent properties thereof.

22 Claims, 2 Drawing Sheets

U.S. PATENT DOCUMENTS

| | | | | |
|---|---|---|---|---|
| 5,788,068 A | | 8/1998 | Fraser et al. | 206/310 |
| 5,799,782 A | | 9/1998 | Gelardi | 206/308.1 |
| 5,819,926 A | * | 10/1998 | O'Brien et al. | 206/308.1 |
| 5,829,584 A | * | 11/1998 | Raucci, Jr. | 206/308.1 |
| 5,839,576 A | * | 11/1998 | Kim | 206/308.1 |
| 5,887,714 A | * | 3/1999 | Yeo | 206/308.1 |
| 5,894,924 A | | 4/1999 | Koch | 206/310 |
| 5,906,275 A | * | 5/1999 | Jokic | 206/308.1 |
| 5,931,291 A | | 8/1999 | Sedon et al. | |
| 5,931,294 A | | 8/1999 | Weingarden et al. | 206/308.1 |
| 5,996,788 A | | 12/1999 | Belden, Jr. et al. | 206/310 |
| 6,029,848 A | | 2/2000 | Cha et al. | 220/837 |
| 6,047,819 A | * | 4/2000 | Borst et al. | 206/232 |
| 6,104,679 A | | 8/2000 | Sollish | 369/33 |
| 6,165,391 A | | 12/2000 | Vedamuttu | |
| 6,170,658 B1 | * | 1/2001 | Dering | 206/308.1 |
| 6,206,186 B1 | | 3/2001 | Cerda-Vilaplana et al. | 206/308.1 |
| 6,250,461 B1 | | 6/2001 | Hu | 206/310 |
| 6,279,739 B1 | * | 8/2001 | Moore et al. | 206/312 |
| 6,283,284 B1 | | 9/2001 | Crane et al. | 206/310 |
| 6,298,986 B1 | * | 10/2001 | Chang | 206/310 |
| 6,357,584 B1 | * | 3/2002 | Simpson | 206/308.1 |
| 6,363,043 B1 | | 3/2002 | Kondo | 369/53.21 |
| 6,363,987 B1 | * | 4/2002 | Koch | 156/391 |
| 6,364,108 B1 | | 4/2002 | Bin | 206/310 |
| 6,454,090 B1 | | 9/2002 | Flores, Jr. et al. | 206/308.1 |
| 6,764,242 B1 | * | 7/2004 | Karten et al. | 402/73 |

* cited by examiner

FIG. -1-
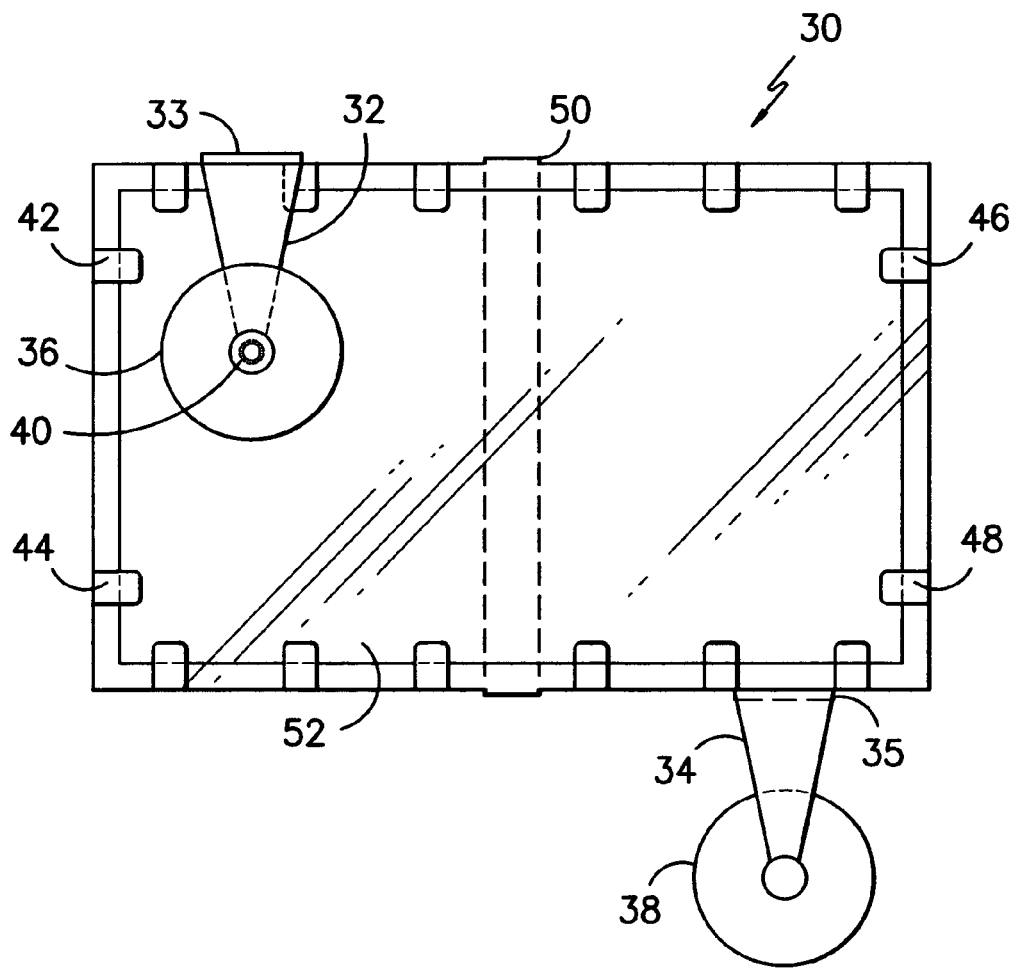
FIG. -2-

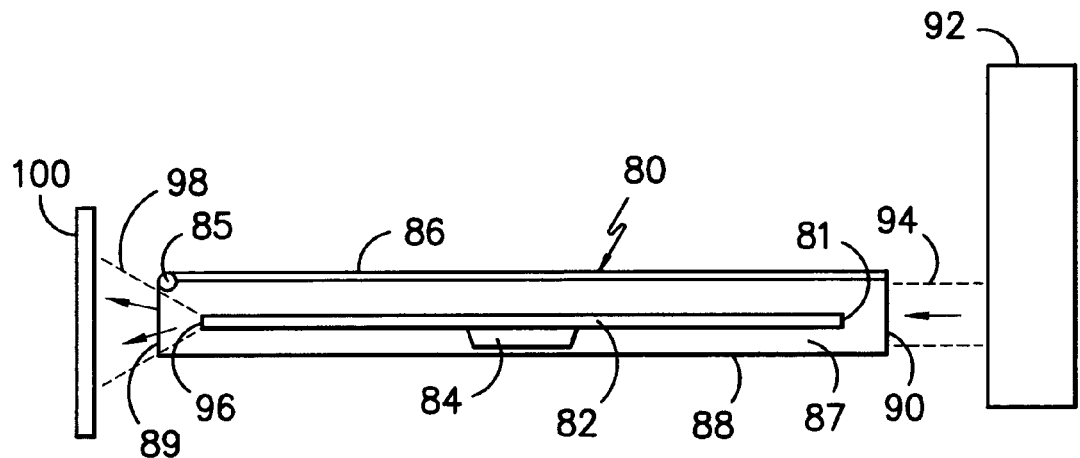
FIG. -3-
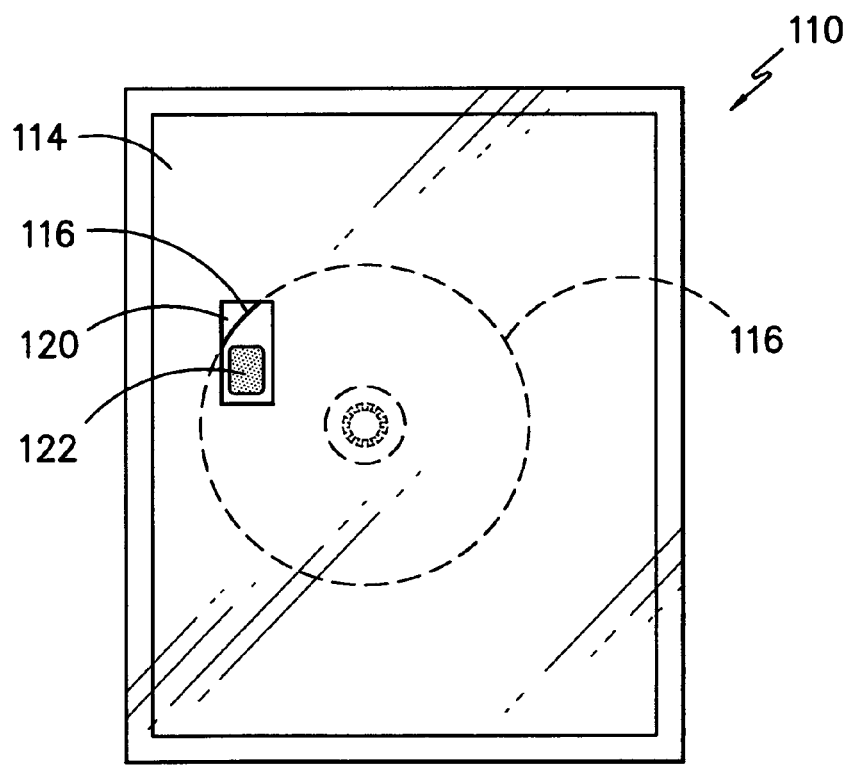
FIG. -4-

CONFIGURATION OF CLARIFIED POLYPROPYLENE OPTICAL DISC STORAGE UNITS

FIELD OF THE INVENTION

This invention relates to novel, quick, and reliable detection methods for determining the authenticity of optical and/or audio disc articles (such as compact discs, digital video discs, CD-ROM discs, and the like). Such a method basically entails the incorporation of an identifier or marking means within the edges of target optical discs or within any other portion of a target disc such that exposure to non-visible light sources will provide the desired identification upon irradiation or detection of the marking means therein. Such an identifier or marking agent thus may be utilized in conjunction with a transparent holding case whereby the optical discs may be exposed through the transparent walls thereof to permit detection of counterfeit or authentic discs without requiring opening of the case itself. Such a method may also be utilized for discs that are removed from or have not been placed and sealed within such a case as well. Specific methods of utilizing particular transparent cases are thus also encompassed within this invention as are novel storage unit configurations to maximize the benefits of the transparent properties thereof.

DISCUSSION OF THE PRIOR ART

Optical data storage discs, such as compact discs (CDs), digital video discs (DVDs), and compact discs having read-only memory (CD-ROMs), have been utilized within the entertainment and computer field for a number of years, with DVDs recently entering the market with much higher amounts of available encoded information for more impressive video results. Such discs generally comprise a layer of plastic material, on one side of which is formed a micro-relief pattern in the form of indentations which comprise an encoded information signal. This information-containing side exhibiting such a micro-relief pattern is then provided with a lacquer-protected metallized reflective layer to permit reading via a laser sensor. DVDs may contain more than one such layer of micro-relief patterns thus providing increased amount of information. Such DVDs exhibit several formats but always comprise two substrates, each formed with at least one information layer, that are secured to one another. Furthermore, the lacquered portion of the disc, generally being solely on one side, usually is provided with visible printed information for identification, informational, and/or aesthetic purposes to the user. Standard and particular production methods for such discs are disclosed within such documents as U.S. Pat. No. 6,165,391 and European Patent EP 0608358B1 (including the production of discs including holographic images embossed in the lacquer forming the protective layer for the metallized surface in order for the micro-relief pattern to define such an holographic image).

Such optical discs are normally formed from polycarbonate material which is injected into an injection molding machine in which a stamper is present, the stamper forming the pattern of indentations in the subsequently formed disc to provide the encoded signal. Other techniques utilize compression molding with a specific mold to provide the encoded signals therein.

The discs may thus include certain holographic images on the surface as well as different additives within the plastic layer, all not detrimental to the operation of the target disc itself. The periphery of the disc (which is normally produced in circular configuration) is thus available for utilization of any number of identification purposes without affecting the sound or vision quality of the encoded information therein.

Furthermore, storage units for such discs have predominately been either polystyrene in nature (for CDs and CD-ROMs) or black (and thus opaque) polypropylene (for DVDs). Polystyrene is generally very clear and has become commonplace in terms of CD and CD-ROM storage; however, such material has proven to be less than reliable in terms of long-term usage. Polystyrene is generally susceptible to breakage easily, requires a two piece case to provide a hinge, and is more expensive than polyolefins. Opaque polypropylene prevents the ability to view the actual disc prior to opening of the unit itself. Polypropylene withstands certain forces better than polystyrene (such as accidental drops, colliding with solid objects, etc.), and is cheaper than such an expensive material. Furthermore, transparent polypropylene has been utilized to a certain degree as well to reduce costs in other ways. For example, DVDs generally include an attached sleeve to the target storage unit of transparent thin film in order to place an identifying publication therein. Such a thin film sleeve increases costs to such a degree that certain storage unit producers have noted the ability to remove the need for such a costly thin film sleeve and move the published identification papers within the storage unit itself. Thus, with sufficient transparency, the identifying publications can be viewed without opening the box itself.

Unfortunately, even with such a development in storage unit design and production, there has been a lack of maximization of such a benefit. In the past, booklets of limited size have been produced for informational purposes for the user. Such booklets were placed within the storage unit but normally required removal from the storage unit itself prior to reading. Such booklets also cost a great deal of money to produce and pack. There thus exists the need to maximize the benefits of having the full published information documentation within the inside of the target disc storage unit. To date, for example, there still exists a standard configuration wherein the discs as stored remain within the storage unit and thus act as obstacles to reading the provided printed information literature accompanying the disc itself. To date, there has been no discussion or fair suggestion on how best to maximize such a limited design in order to maximize the benefits of utilizing transparent polyolefin storage unit materials themselves.

Additionally, counterfeit audio and/or optical discs are an enormous problem within the pertinent industries. In fact, billions of dollars a year are lost to the respective recording industries due to forged or counterfeited articles. Combating such a problem has proven extremely difficult as the appearance of such counterfeit discs are generally the same as those of authentic quality. Thus, proving authenticity is generally difficult, if not impossible. Past attempts at preventing or detecting such counterfeit discs have included technologies such as anti-copying/encryption technologies, digital signatures, watermarks, and the like, embedded within the disc's content. However, these technologies have proved ineffective as decoders have been easy to develop for encryption and identifiers have been easy to copy. Therefore, stopping such counterfeit articles is quite elusive, particularly at the customs (importation) or customer level. A simplified method of facilitating such needed detection of counterfeit articles is thus of utmost importance to these industries. Of particular interest is the ability to provide such detection when discs are shrink-wrapped together, prior to placement within ultimate storage units, as well as upon placement within such storage units (which are also generally shrink-wrapped for consumer purchase) in a manner that detection can be made without having to open the storage unit itself (and thus provides an easy method for the distributor to determine disc authenticity without affecting the value of the pre-packaged disc). Thus, such a desirable simplified detection method has not been accorded these particular industries to date.

OBJECTS AND SUMMARY OF THE INVENTION

It is thus an object of this invention to provide a manner of detecting counterfeit optical discs either while removed from any packaging, while present within a closed storage unit, or while present in a shrink-wrapped package of multiple discs. Another object of this invention is to provide a detection method for the authenticity of optical discs through the exposure of such discs to light within the non-visible spectrum and viewing the resultant appearance of the edges of such discs. Yet another object of the invention is to provide a simultaneous manner of efficient storage of discs and improved access to provided informational literature accompanying such discs.

Accordingly, this invention encompasses a method of determining the authenticity and/or counterfeit status of at least one optical disc comprising the steps of (a) providing at least one optical disc including at least one authenticity identifier selected from the group consisting of at least one iridescing compound, at least one iridescing pattern, and any combinations thereof, wherein said identifier is identifiable at least along the periphery of said disc;

(b) exposing said disc to a source of iridescent light within the non-visible spectrum; and (c) viewing the periphery of said at least one disc for the presence of said identifier; wherein if said identifier is present, then said disc is considered authentic, and wherein if said identifier is not present, then said disc is not considered authentic. Also encompassed within this invention is a method for determining the authenticity and/or counterfeit status of at least one optical disc present within a closed transparent storage unit, said method comprising the steps of (a) providing at least one optical disc including at least one identification image thereon; and (b) viewing said optical disc within said closed transparent storage unit for the presence of said at least one identification image;

wherein if said at least one holographic is viewed, then said disc is considered authentic, and wherein if said at least holographic image is not present, then said disc is not considered authentic. Further encompassed within this invention is a method of determining the authenticity and/or counterfeit status of at least one optical disc present within a closed transparent storage unit, said method comprising the steps of (a) providing an optical disc within said closed transparent storage unit, said optical disc including at least one authenticity identifier selected from the group consisting of at least one iridescing compound, at least one iridescing pattern, at least one identifying pattern, and any combinations thereof, wherein said identifier is identifiable at least along the periphery of said disc;

(b) exposing said storage unit disc to a source of iridescent light within the non-visible spectrum; and (c) viewing the periphery of said at least one disc while still within said closed storage unit for the presence of said identifier; wherein if said identifier is present, then said disc is considered authentic, and wherein if said identifier is not present, then said disc is not considered authentic. Lastly, this invention also encompasses a polyolefin-containing storage unit including at least one peripheral edge and including at least one rosette for optical disc storage, said at least one rosette being present on an arm which is permanently or temporarily attached to said at least one peripheral edge via a movable hinge, wherein said optical disc may be maneuvered outside of said storage unit while simultaneously being attached to said rosette which in turn remains attached to said arm while said arm remains attached to said at least one peripheral edge of said storage unit.

As it pertains to this invention, the term "authenticity identifier" is intended to encompass any type of additive, whether integrated within the target disc or adhered to the surface of the target disc, that can be illuminated, preferably through utilization of a light source within the non-visible spectrum (such as, without limitation, infrared light, infrared laser, ultraviolet light, ultraviolet laser, and the like). Preferably, such an authenticity identifier is provided wherein the resultant detection thereof is noted through visible realization of a unique signal. Thus, bar-coding, iridescent compounds, patterns of bar-codes intermixed with iridescent compounds, patterns of iridescent compounds, and the like, are possible, non-limiting available manners of providing such an authenticity identifier thereon or therein the target optical disc.

More preferably, such an authenticity identifier is present within the plastic layer of the target optical, and most preferably added thereto in such a manner as to permit identification of such an additive at the surface of the periphery of the target optical disc itself. A distinct problem facing the optical disc industries concerns the fact that individual discs are counterfeited readily and may be passed off as authentic during importation through customs departments. Generally, prior to packing within desired storage units, such discs are produced in large quantities and are shrink-wrapped hundreds at a time for shipping. Such shrink-wrap is generally transparent in nature as well and thus permits ease in identification of an authenticity identifier at the periphery of each individual disc when present in shrink-wrapped form prior to packing within storage units. In such a manner, the shrink-wrapped discs may be illuminated and analyzed for the presence of the needed authenticity identifier. Such a method thus facilitates review by the proper importation customs officials in order to prevent unlawful shipping of counterfeit articles.

Such a periphery configuration also facilitates authentication of storage unit-packed optical discs, primarily those packed within transparent cases. Generally, the information literature accompanying the disc(s) is sufficiently large that it resides within the entire space provided by both halves of the storage unit itself. In such manner, the only open space remaining for easy viewing of the target disc(s) is only the peripheral edge(s) thereof through the transparent material. The storage unit must thus exhibit a proper level of transparency to permit illumination of the disc periphery therein for such an analysis. However, although not required, the design of the storage unit may be improved to the degree that there is substantially no obstacle to illumination and thus analysis of the optical disc therein other than the plastic material of the storage unit itself. For instance, with common polypropylene cases, a living hinge is utilized to provide a completely (or at least substantially) symmetric storage unit that opens easily to provide two, again, substantially, symmetric halves. In such a manner, storage unit, when in closed position, exhibits partition lines that may hinder the view of the target disc's peripheral edges. Thus, a different design can be employed to maximize viewing of the illuminated disc peripheral edges wherein three edges of the storage unit do not include partitions therein and are free from any obstacles to peripheral edge viewing. Thus, the storage unit design may be asymmetric in configuration with a living hinge employed (for preferred transparent polypropylene) on a top flap that may be removably attached to the remaining portions of the storage unit such that the stored disc is placed within the bottom portion thereof the sides of which do not exhibit any impedance to viewing. Such a design is noted below in the drawings. As a result of any manner of detection in such a manner, the disc contained therein can be analyzed prior to opening and/or removal, thereby preventing a loss in value of the target disc or at least providing a much simpler method of determining authenticity for the distributor, exhibitor, and/or consumer.

The utilization of polyolefin (preferably transparent polypropylene) aids in removing the problems associated with polystyrene jewel boxes as well. Generally, such polystyrene boxes are brittle and, as noted above, highly susceptible to breakage, both within the flap portions of the target box, as well as at the detachable hinge portion(s). In addition, such boxes generally only permit easy viewing of the target disc therein at one side. Clarity is an important characteristic of polystyrene; however, one edge of the jewel box is usually covered by the title of the work provided within the disc itself and two others are roughened such that viewing through such a side is nearly impossible. With the preferred transparent polypropylene storage units of this inventive method, the detection possibilities are increased to three sides of the target storage unit, easily. Although polystyrene is not preferred within this inventive method, of course, since it does provide a certain degree of ability to view a peripheral edge of the target disc, such a material may also be utilized.

Holographic images have been produced within the micro-relief pattern(s) of optical discs in the protective lacquer in order to provide authentication or anti-counterfeiting techniques. In the past, however, such images required first removing the target disc from its storage unit prior to viewing such an anti-counterfeit marking device. Thus, the ability to provide a simpler method of counterfeit detection via transparent storage unit materials, and configuration of the particular storage unit itself, has not been previously investigated. With such a transparent storage unit, the aforementioned benefits of moving the identification literature within the case provides some difficulty in determining proper views of the authenticity image (herein defined as a holographic image, a bar-code, or other like imaging effect that indicates uniqueness of source). If the literature is too large in size and thus only permits viewing at the peripheral edges (as with the other preferred embodiment noted above), then either openings may be provided in the literature for proper viewing of the authenticity image at specified areas of the target disc, or the authenticity image may also be placed on the peripheral edges for proper viewing and analysis by the target audience.

The transparency of the storage unit is of utmost importance for at least one preferred method of authenticity detection. In such a manner, the ability to determine counterfeit discs while the storage unit is either closed, sealed, or both, is not only facilitated, but also permitted. With promotional literature material utilized, either within a sleeve, or placed within the storage unit itself, generally such paper material is placed in such a way as to prevent easy view of the surface of the target disc. Thus, there is a need to either provide a cut-out pattern within the promotional material or smaller material in general, to permit viewing of the surface of the target disc, unless viewing of the peripheral edges is accessible and easier. The transparency of the storage unit material thus accords the ability to actually view either the surface or the peripheral edges without removing the target disc from such a case.

For this purpose, polypropylene is most highly desired, in particular clarified polypropylene (cPP). Any standard clarifying agent may be utilized for this purpose, however, highly preferred are those of the substituted benzylidene sorbitol type, most highly preferred being 3,4-dimethyldibenzylidene sorbitol (available from Milliken & Company under the tradename MILLAD® 3988 (MILLAD® 3940 may also be utilized; however, due to plate-out and organoleptic issues, such an additive is not as highly desired for such a purpose). material in the reaction. Such an additive is indicated within U.S. Pat. No. 5,731,474 to Scrivens et al., for example, and is generally added to target polypropylene in an amount of from about 0.01 to about 2 percent by weight, preferably about 0.1 to about 1 percent by weight, based upon the total weight of the composition may be provided.

The polyolefin polymers of the present invention may include aliphatic polyolefins and copolymers made from at least one aliphatic olefin and one or more ethylenically unsaturated comonomers. Generally, the comonomers, if present, constitute a minor amount, e.g., about 10 percent or less or even about 5 percent or less, of the entire polyolefin, based upon the total weight of the polyolefin. Such comonomers may serve to assist in clarity improvement of the polyolefin, or they may function to improve other properties of the polymer. Examples include acrylic acid and vinyl acetate, etc. Examples of olefin polymers whose transparency can be improved conveniently according to the present invention are polymers and copolymers of aliphatic monoolefins containing 2 to about 6 carbon atoms which have an average molecular weight of from about 10,000 to about 2,000,000, preferably from about 30,000 to about 300,000, such as polyethylene, linear low density polyethylene, polypropylene, crystalline ethylenepropylene copolymer, poly(1-butene), 1-hexene, 1-octene, vinyl cyclohexane, and polymethylpentene. The polyolefins of the present invention may be described as basically linear, regular polymers that may optionally contain side chains such as are found, for instance, in conventional, low density polyethylene.

The preferred polypropylene composition can be obtained by adding a specific amount of the substituted dibenzylidene sorbitol directly to the polypropylene (or copolymer), and merely mixing them by an suitable means. Alternatively, a concentrate containing as much as about 20 percent by weight of the additive in a polypropylene masterbatch may be prepared and be subsequently mixed with the resin. Furthermore, the clarifying additive (and other additives) may be present in any type of standard polyolefin additive form, including, without limitation, powder, prill, agglomerate, liquid suspension, and the like, particularly comprising dispersion aids such as polyolefin (e.g., polyethylene) waxes, stearate esters of glycerin, montan waxes, mineral oil, and the like. Basically, any form may be exhibited by such a combination or composition including such combination made from blending, agglomeration, compaction, and/or extrusion.

Other additives such as a transparent coloring agent or plasticizers (e.g., dioctyl phthalate, dibutyl phthalate, dioctyl sebacate, mineral oil, or dioctyl adipate), can be added to the composition of the present invention so long as they do not adversely affect the improvement of transparency of the product. It has been found that plasticizers such as those exemplified above may in fact aid in the improvement of the transparency by the di-acetal. In particular, it is further contemplated that certain organoleptic improvement additives be added for the purpose of reducing the migration of degraded benzaldehydes from reaching the surface of the desired article. The term "organoleptic improvement additive" is intended to encompass such compounds and formulations as antioxidants (to prevent degradation of both the polyolefin and possibly the target alditol derivatives present within such polyolefin), acid neutralizers (to prevent the ability of appreciable amounts of residual acids from attacking the alditol derivatives), and benzaldehyde scavengers (such as hydrazides, hydrazines, and the like, to prevent the migration of foul tasting and smelling benzaldehydes to the target polyolefin surface). Such compounds and formulations can be added in any amounts in order to provide such organoleptic improvements as needed. However, the amounts should not appreciably affect the haze results for the target polyolefin itself. Thus, lower amounts on the order of from about 20 ppm to about 2,000 ppm of the total polyolefin component are desired.

Polyolefin Formation and Testing

Transparent polypropylene optical disc storage units were produced comprising DMDBS clarifying agents sample random copolymer polypropylene (RCP) resins, as noted below. The polypropylene was produced dry blended in a Welex mixer at ~2000 rpm, extruded through a single screw extruder at 400–450° F., and pelletized. Accordingly, batches of target polypropylene were produced in accordance with the following table:

RANDOM COPOLYMER POLYPROPYLENE COMPOSITION TABLE

| Component | Amount |
| --- | --- |
| Polypropylene random copolymer flake (3% ethylene) (MF = 12) | 1000 g |
| Irganox ® 1010, Primary Antioxidant (from Ciba) | 500 ppm |
| Irgafos ® 168, Secondary Antioxidant (from Ciba) | 1000 ppm |
| Calcium Stearate, Acid Scavenger | 800 ppm |
| DMDBS | 2500 ppm |

The base resin (random copolymer, hereinafter "RCP") and all additives were weighed and then blended in a Welex mixer for 1 minute at about 1600 rpm. All samples were then melt compounded on a Killion single screw extruder at a ramped temperature from about 204° to 232° C. through four heating zones. The melt temperature upon exit of the extruder die was about 246° C. The screw had a diameter of 2.54 cm and a length/diameter ratio of 24:1. Upon melting the molten polymer was filtered through a 60 mesh (250 micron) screen. The target storage units of this polypropylene material were then made through extrusion into an Arburg 25 ton injection molder with the proper mold configuration. The molder was set at a temperature anywhere between 190 and 260° C., with a range of 190 to 240° C. preferred, most preferably from about 200 to 230° C. (for the Tables below, the standard temperature was 220; a # denotes a temperature 210, a ^ denotes a temperature of 200, and a @ denotes a temperature of 230). The storage units had dimensions of about 200 mm×200 mm×1.27 mm, and were made in a mold having a mirror finish. The mold cooling circulating water was controlled at a temperature of about 25° C.

The haze values were measured by ASTM Standard Test Method D1003-61 "Standard Test Method for Haze and Luminous Transmittance of Transparent Plastics" using a BYK Gardner XL-211 Hazemeter. Nucleation capabilities were measured as polymer recrystallization temperatures (which indicate the rate of polymer formation provided by the presence of the nucleating additive) by melting the target plaques, cooling the plaques at a rate of about 20° C./minute, and recording the temperature at which polymer reformation occurs. The resultant haze of the product storage units were about 8.0%, a level of sufficient transparency to permit illumination of the optical discs stored therein for authenticity detection in accordance with the inventive methods.

The optical discs themselves may be of any standard composition, wherein at least one plastic layer is coated with at least one information layer, which is further coated with at least one metallized layer, and which is further coated with a lacquer layer. Preferably, the plastic layer is of a material having some compressibility, such as PERSPEX® (polymethyl methacrylate, or PUMA) and has a thickness between 5 mm and 20 mm.

The metal layer is preferably nickel, although any other reflective metal may be utilized. The lacquer is preferably a methacrylate. The general production methods are as noted above within U.S. Pat. No. 6,165,391, herein entirely incorporated by reference.

BRIEF DESCRIPTION OF THE DRAWINGS

The present invention will now be described in more detail by way of example only, with reference to the accompanying drawings wherein:

FIG. 1 is a cross-sectional view of a compact disc.

FIG. 2 is a top view of the inventive movable rosette arm storage unit configuration.

FIG. 3 shows a method of viewing a disc through a transparent polypropylene storage unit to detect the authenticity identifier on the peripheral edge of the target disc.

FIG. 4 shows a method of viewing a disc through a transparent polypropylene storage unit to detect the identifying image on the surface of the target disc.

DETAILED DESCRIPTION OF THE DRAWINGS

Referring now to FIG. 1, an optical disc is shown which comprises a plastic substrate 10 normally formed from polycarbonate, preferably comprising either at least one iridescent compound, such as an Ultraviolet tag (what type?) which illuminates at the peripheral edge 8 when exposed to an ultraviolet light source, or a bar-code stamped into the peripheral edge 8, or a holographic image present at the peripheral edge 8, the upper surface 11 having a pattern of pits formed therein which define a data recording. The pitted surface 11 is provided with a metallic film 12 so as to provide a light reflecting surface, the metallic layer 12 being covered by a protective layer of lacquer 13 which may be an ultraviolet light curable resin such as that sold under the trade mark RENGOLUX®.

The resin is normally applied to the disc by spin coating, i.e. the resin is applied to the disc at a position slightly radially inwardly from the radially innermost extremity of the metallized surface, the disc being rotated at speed, such that the resin flows towards the circumference of the disc, and is cured by exposure to ultraviolet light.

The manner in which the polycarbonate substrate 10 is formed is normally by injection molding. A metal plate known as a stamper having a surface formed with an information layer is placed in the cavity of an injection mould and polycarbonate material is injected into the mould.

The injection molding process produces a polycarbonate substrate bearing the information layer and having a substantially flat surface and even thickness, with maybe a variance of a few microns with the exception of the peripheral ridge 14 in the polycarbonate substrate which may be in the region of 50 microns thicker than the average thickness of the disc elsewhere. The resultant disc exhibits the desired authenticity identifier or authenticity image thereon, particularly at the peripheral edge 8.

FIG. 2 illustrates a desired structure of an inventive transparent cPP storage unit 30. Such a unit 30 includes movable arms 32, 34 which are attached to the unit 30 via living hinges 33, 35. Although such living hinges 33, 35 are preferred embodiments (since production of such a molded storage unit 30 is easier through a single mold), detachable hinges (not illustrated) may also be utilized. The discs 36, 38 are attached to the arms 32, 34 via individual rosettes 40 (other not illustrated). The moved arm 34 shows the ability to maneuver the particular disc 38 outside the unit 30 in order to read and/or view the desired promotional literature 52 which is held in place with brackets 42, 44, 46, 48 to the unit 30. The other arm 32 may also be moved in like fashion. The number of discs permitted in such a configuration may be as many as six with individual moving arms attached at each segment of the unit 30 separated by the spine hinge 50. Thus, the promotional literature 52 may be moved inside the unit 30 and easily read completely wither via movement of the individual arms 32, 34 or through the clarified wall of polypropylene on which the promotional literature rests (not illustrated).

FIG. 3 depicts one preferred method of determining the authenticity of a disc 82 comprising an ultraviolet-based authenticity identifier (not illustrated) through a cPP storage unit 80. While the storage unit 80 is in a closed position, there is a top flap 86 attached via a living hinge 85 and a recessed portion 87 having a bottom side 88 a first end 90 and a second including said living hinge 89. The disc 82 is attached to the unit via a rosette 84. When in closed position, an ultraviolet light source 92 provides ultraviolet rays 94 which are directed into the unit 80. When the rays 94 contact the disc 80, the iridescent result 98 may either be viewed through second end 89 of the unit 80 and analyzed via any instrument 100 (including human sight and recognition), or viewed in the same manner through the first end 90 of the unit 80. Such an authenticity identifier may include a bar-code impressed within the peripheral edges 81 of the disc 82, or a holographic image placed on the peripheral edges of the disc 82, or an iridescent color integrated within the disc 82, as merely preferred examples, or adhered to the peripheral edges 81 of the disc 82. Any combination thereof, including patterns in like manner may be utilized as well for such a purpose.

FIG. 4 thus depicts another preferred embodiment utilizing the benefits of a cPP storage unit 110. In closed position, a disc (partially shown as 116) resides within the unit 110, including promotional material 114 present within the unit 110 as well. A cut-out portion 120 thus permits viewing of an authenticity image 122, such as a holographic image, or bar-code, on the surface of the disc 116. Thus, it is evident that suitable, simple methods of counterfeit detection may be provided through the utilization of such cPP units. The configuration improvements also provide a maximum utilization of space for the enjoyment and aesthetic pleasure of the consumer as well with regards to the promotional material, or other like supplied articles accompanying the commercialized disc.

There are, of course, many alternative embodiments and modifications of the present invention which are intended to be included within the spirit and scope of the following claims.

What we claim is:

1. A substantially transparent clarified polyolefin media disc storage unit having an interior side and an exterior side, said unit comprising:
    (a) a first wall and a second wall, said first and second walls each having a respective inner edge forming a spine, wherein said first wall, second wall, and spine comprise a unitary continuous sheet of polyolefin;
    (b) said spine and said first and second walls being substantially transparent and clarified;
    (c) said storage unit further providing at least one holding means, said holding means being adapted for releasably attaching an optical media disc, said holding means comprising an arm hingedly connected to said storage unit, said arm further comprising a rosette for releasable connection to a media disc; and
    (d) wherein said storage unit is adapted for receiving on its interior side promotional literature, said literature being positioned against the interior surface of said walls and spine, said literature being visually identifiable from the exterior of said unit through said walls and said spine, wherein when said literature rests against said clarified walls and clarified spine said literature is visually perceptible from the exterior side of said storage unit, said literature comprising a cut-out portion adapted to facilitate direct visual perception of a disc residing within a closed storage unit from outside of the unit.

2. The unit of claim 1, wherein said visual perception facilitates authentication of said disc.

3. A substantially transparent clarified polyolefin media disc storage unit having an interior side and an exterior side, said unit comprising:
    (a) a first wall and a second wall, said first and second walls each having a respective inner edge forming a spine, wherein said first wall, second wall, and spine comprise a unitary continuous sheet of polyolefin;
    (b) said spine and said first and second walls being substantially transparent and clarified;
    (c) said storage unit further providing at least one holding device, said holding device being adapted for releasably attaching an optical media disc, said holding device comprising an arm hingedly connected to said storage unit, said arm further comprising a rosette for releasable connection to a media disc;
    (d) wherein said storage unit is adapted for receiving on its interior side promotional literature, wherein when said literature rests against said clarified walls and clarified spine said literature being visually perceptible and readable from the exterior side of said storage unit; and
    (e) said storage unit being adapted for receiving a disc having embedded therein an authentication means, wherein when said disc resides in said storage unit with said storage unit in the closed position said disc may be authenticated from the exterior of said storage unit without opening said storage unit and wherein said disc further comprises an authentication means, further wherein said disc is identifiable as authentic by subjecting said storage means in the closed position to electromagnetic radiation.

4. A substantially transparent clarified polyolefin media disc storage unit having an interior side and an exterior side, said unit comprising:
(a) a first wall and a second wall, said first and second walls each having a respective inner edge forming a spine, wherein said first wall, second wall, and spine comprise a unitary continuous sheet of polyolefin;
(b) said spine and said first and second walls being substantially transparent and clarified;
(c) said storage unit further providing at least one holding device, said holding device being adapted for releasably attaching an optical media disc, said holding device comprising an arm hingedly connected to said storage unit, said arm further comprising a rosette for releasable connection to a media disc; and
(d) wherein said storage unit is adapted for receiving on its interior side promotional literature, wherein when said literature rests against said clarified walls and clarified spine said literature being visually perceptible and readable from the exterior side of said storage unit, wherein said polyolefin comprises clarified polypropylene, said polypropylene comprising a nucleating agent, said nucleating agent comprising in part a derivative of a substituted benzylidene sorbitol (DBS).

5. The storage unit of claim 4 wherein said polyalofin comprises a copolymer, said copolymer comprising no more than about 10 percent by weight of said polyolefin.

6. A clarified polypropylene-containing media disc storage unit, said unit having an interior side and an exterior side, said unit comprising:
(a) a first wall and a second wall, said first and second walls being united along at least one edge of each said wall to form a spine with a first line of intersection between said spine and said first wall and a second line of intersection between said spine and said second wall such that the first and second walls are rotatable about the first and second lines of intersection respectively to open and close the storage unit, wherein said first wall, second wall, and spine collectively comprise a unitary continuous sheet, said sheet consisting essentially of polypropylene;
(b) said spine and said first and second walls being substantially visually transparent;
(c) said storage unit further providing at least one disc holding device, said disc holding device being adapted for releasably attaching a media disc, said holding device comprising at least one arm hingedly connected to said storage unit, said arm further comprising at least one rosette for releasable connection of a media disc to said arm, wherein said arm is removable from said storage unit, said arm being capable of displacement outside of said storage unit while said storage unit is open, thereby facilitating visual perception of essentially the entire contents of said storage unit while said storage unit is open; and
(d) wherein said storage unit is adapted for receiving on its interior side promotional literature, wherein when said literature is provided in close proximity to said walls and spine, said literature being visually perceptible from the exterior side of said substantially transparent storage unit.

7. The storage unit of claim 6, said unit further comprising promotional literature inside said unit, said literature being positioned against the interior surface of said walls and spine, said literature being visually identifiable from the exterior of said unit through said walls and said spine.

8. The storage unit of claim 7, said literature comprising a cut-out portion adapted to facilitate direct visual perception of a disc residing within a closed storage unit from outside of the unit.

9. The unit of claim 8, wherein said visual perception facilitates authentication of said disc.

10. The storage unit of claim 7, said unit further comprising a disc within said unit.

11. The storage unit of claim 10, wherein said disc further comprises an authentication means embedded in said disc, said authentication means being selected from the group consisting of: holographic images, iridescing compounds, and bar codes.

12. The storage unit of claim 11, wherein said disc further comprises an authentication means embedded in said disc, said authentication means comprising a holographic image upon said disc, wherein said image may be positioned to correspond with said cut-out portion of said literature, whereby said holographic image is visually perceptible from the outside of said storage unit when said storage unit is in the closed position.

13. The storage unit of claim 6 wherein said polyolefin comprises clarified polypropylene, said polypropylene further comprising a nucleating agent, said nucleating agent comprising in part a derivative of a substituted benzylidene sorbitol (DBS).

14. The storage unit of claim 13 wherein said polyolefin comprises a copolymer, said copolymer comprising no more than about 10 percent by weight of said polyolefin.

15. The storage unit of claim 6 wherein said storage unit is adapted for receiving a disc having embedded therein authentication means, wherein when said disc resides in said storage unit with said storage unit in a closed position said disc is capable of being authenticated without the necessity of opening said storage unit.

16. The storage unit of claim 15 wherein said storage unit is adapted for receiving radiation in its closed position, wherein said radiation is operable to assist in identifying the authenticity of a disc residing within said storage unit.

17. The storage unit of claim 15, wherein said disc further comprises an authentication means, further wherein said disc is identifiable as authentic by subjecting said storage means in the closed position to electromagnetic radiation.

18. The storage unit of claim 6 wherein said polyolefin includes at least some portion that is polystyrene.

19. A method of retaining and displaying a media disc, said method comprising:
(a) providing a polypropylene-containing storage unit, said storage unit being capable of assuming a closed position and an open position, said storage unit having an interior side and an exterior side, said storage unit further comprising a first wall and a second wall, said first and second walls being united along at least one edge of each said respective wall, said walls forming a living spine along said united edge, said living spine forming a line about which said storage unit may be opened or closed, wherein said first wall, second wall, and spine comprise a unitary continuous sheet, said sheet consisting essentially of polypropylene, wherein said spine and said first and second walls are substantially visually transparent, said storage unit further providing at least one disc holding device, said disc holding device being adapted for releasably attaching a media disc, said holding device comprising at least one arm hingedly connected to said storage unit, said arm further comprising at least one rosette for releasable connection of a media disc to said arm, wherein said arm is removable from said storage unit, said arm being displaceable or removable to the exterior of said storage unit, thereby facilitating visual perception of the entire contents of said storage unit; and (b) providing at least one sheet of promotional literature on the interior side of said storage unit, said literature resting against said walls and said spine, said literature being visually perceptible through said walls and spine from the exterior side of said substantially transparent storage unit;

(c) affixing a media disc upon said rosette;

(d) closing said storage unit; and (e) authenticating said media disc while maintaining said storage unit in a closed position by transmitting radiation through said storage unit and receiving said transmitted radiation to authenticate said media disc.

20. The method of claim 19 wherein said storage unit is further provided with a cut-out portion upon said literature, said disc being provided with an authentication image upon the surface of said disc, further wherein said disc is authenticated by perceiving said image while said disc is mounted in said closed storage unit.

21. The method of claim 20 wherein said image is a holographic image, further wherein said perception of said image is by way of visual perception.

22. The method of claim 20 wherein said image comprises a bar code, further wherein said perception of said image occurs by machine perception.

* * * * *

UNITED STATES PATENT AND TRADEMARK OFFICE
CERTIFICATE OF CORRECTION

PATENT NO. : 6,991,099 B2
APPLICATION NO. : 10/122718
DATED : April 15, 2002
INVENTOR(S) : Delaere et al.

It is certified that error appears in the above-identified patent and that said Letters Patent is hereby corrected as shown below:

Col. 10, line 66 replace "without opening said storage unit and" with --without opening said storage unit, and --

Col. 11, line 28 replace "said polyalofin" with -- said polyolefin --

Col. 11, lines 35-36 replace "each said wall" with -- each of said walls--

Col. 12, line 56 replace "each said respective wall" with -- each of said respective walls --

Signed and Sealed this

Twenty-sixth Day of September, 2006

JON W. DUDAS
*Director of the United States Patent and Trademark Office*

UNITED STATES PATENT AND TRADEMARK OFFICE
CERTIFICATE OF CORRECTION

PATENT NO. : 6,991,099 B2  Page 1 of 1
APPLICATION NO. : 10/122718
DATED : January 31, 2006
INVENTOR(S) : Delaere et al.

It is certified that error appears in the above-identified patent and that said Letters Patent is hereby corrected as shown below:

Col. 10, line 66    replace "without opening said storage unit and" with --without opening said storage unit, and --

Col. 11, line 28    replace "said polyalofin" with -- said polyolefin --

Col. 11, lines 35-36  replace "each said wall" with -- each of said walls--

Col. 12, line 56    replace "each said respective wall" with -- each of said respective walls --

This certificate supersedes Certificate of Correction issued September 26, 2006.

Signed and Sealed this

Twenty-first Day of November, 2006

JON W. DUDAS
*Director of the United States Patent and Trademark Office*